(12) United States Patent
Hecht et al.

(10) Patent No.: US 10,183,333 B2
(45) Date of Patent: Jan. 22, 2019

(54) CIRCULAR CUTTING INSERT HAVING NON-CIRCULAR PERIPHERAL EDGE

(71) Applicant: Iscar, Ltd., Tefen (IL)

(72) Inventors: Gil Hecht, Nahariya (IL); Daniel Hen, Nahariya (IL)

(73) Assignee: Iscar, Ltd., Tefen (IL)

( * ) Notice: Subject to any disclaimer, the term of this patent is extended or adjusted under 35 U.S.C. 154(b) by 130 days.

(21) Appl. No.: 15/368,999

(22) Filed: Dec. 5, 2016

(65) Prior Publication Data

US 2017/0216932 A1    Aug. 3, 2017

Related U.S. Application Data

(60) Provisional application No. 62/290,587, filed on Feb. 3, 2016.

(51) Int. Cl.
*B23B 27/16* (2006.01)
*B23B 27/14* (2006.01)

(52) U.S. Cl.
CPC ........ *B23B 27/1622* (2013.01); *B23B 27/141* (2013.01); *B23B 2200/0461* (2013.01);
(Continued)

(58) Field of Classification Search
CPC ......... Y10T 407/1924; Y10T 407/1942; Y10T 407/1946; Y10T 407/1956;
(Continued)

(56) References Cited

U.S. PATENT DOCUMENTS 4,274,766 A * 6/1981 Raupp, Jr. .............. B23D 43/04
407/113
4,606,678 A   8/1986 Zweekly
(Continued)

FOREIGN PATENT DOCUMENTS

JP    2006-192567 A    7/2006
JP    2007-090496 A    4/2007

OTHER PUBLICATIONS

International Search Report dated Apr. 25, 2017, issued in PCT counterpart application (No. PCT/IL2017/050068).
(Continued)

*Primary Examiner* — Nicole N Ramos
(74) *Attorney, Agent, or Firm* — Womble Bond Dickinson (US) LLP

(57) ABSTRACT

A cutting tool has an insert holder with an indexable cutting insert removably secured therein. The cutting insert has upper and lower end surfaces with a peripheral side surface and a through bore extending therebetween, and a plurality of upper cutting edges formed on an upper peripheral edge. The peripheral side surface includes a non-circular upper relief surface adjacent the upper peripheral edge and a circular upper abutment surface spaced apart from the upper peripheral edge. Each upper cutting edge exhibits mirror symmetry about a bisector plane, and is non-linear in a side view. The through bore has an inner undercut formed by upper and lower bore surfaces located on opposite sides of a median plane, and a clamping member makes contact with one of the upper and lower bore surfaces at an inner contact zone located between the median plane and a seat surface of the insert holder.

25 Claims, 13 Drawing Sheets

(52) U.S. Cl.
CPC ... *B23B 2200/081* (2013.01); *B23B 2200/125* (2013.01); *B23B 2200/202* (2013.01); *B23B 2200/205* (2013.01); *B23B 2200/3627* (2013.01); *B23B 2200/3636* (2013.01)

(58) Field of Classification Search
CPC ......... Y10T 407/1962; Y10T 407/1964; Y10T 407/1936; Y10T 407/23; B23C 2210/084; B23C 2200/08; B23C 2200/083; B23C 2200/085; B23C 2200/12; B23C 2200/125; B23C 2200/20; B23C 2200/203; B23C 2200/28; B23C 2200/286; B23C 2210/04; B23C 2210/045; B23B 27/16; B23B 27/1611
See application file for complete search history.

(56) References Cited

U.S. PATENT DOCUMENTS

| | | | |
|---|---|---|---|
| 5,934,844 A | 8/1999 | Woolley | |
| 6,079,912 A | 6/2000 | Rothballer | |
| 7,264,425 B1 | 9/2007 | Viol | |
| 7,381,015 B2 | 6/2008 | Jonsson | |
| 7,677,145 B2 | 3/2010 | Grund et al. | |
| 8,206,066 B2 | 6/2012 | Men et al. | |
| 8,371,774 B2 | 2/2013 | Zastrozynski | |
| 8,613,576 B2 | 12/2013 | Ebert et al. | |
| 8,657,539 B2 | 2/2014 | Morrison et al. | |
| 8,858,130 B2 | 10/2014 | Morrison et al. | |
| 9,289,834 B2 | 3/2016 | Park et al. | |
| 2010/0054873 A1* | 3/2010 | Men | B23C 5/202 407/42 |
| 2010/0272526 A1* | 10/2010 | Dufour | B23B 27/141 407/114 |
| 2011/0164934 A1 | 7/2011 | Chen et al. | |
| 2012/0076596 A1 | 3/2012 | Kim | |
| 2012/0301235 A1* | 11/2012 | Yoshioka | B23C 5/06 407/100 |
| 2013/0129432 A1* | 5/2013 | Jaeger | B23C 5/207 407/42 |
| 2013/0195567 A1 | 8/2013 | Sunnvius et al. | |
| 2013/0330135 A1* | 12/2013 | Burtscher | B23C 5/207 407/42 |
| 2014/0086694 A1* | 3/2014 | Fang | B23C 5/2221 407/48 |
| 2014/0178135 A1* | 6/2014 | Yamamoto | B23C 5/109 407/42 |
| 2015/0165532 A1* | 6/2015 | Yamamoto | B23C 5/202 407/67 |

OTHER PUBLICATIONS

Written Opinion dated Apr. 25, 2017, issued in PCT counterpart application (No. PCT/IL2017/050068).

* cited by examiner

CIRCULAR CUTTING INSERT HAVING NON-CIRCULAR PERIPHERAL EDGE

RELATED APPLICATIONS

The present application claims priority to U.S. Provisional Patent Application No. 62/290,587 filed Feb. 3, 2016. The contents of the aforementioned application are incorporated by reference in their entirety.

FIELD OF THE INVENTION

The present invention relates to a cutting tool and a cutting insert for use in metal cutting processes in general, and for turning and profiling operations in particular.

BACKGROUND OF THE INVENTION

Within the field of cutting tools used in turning and profiling operations, there are many examples of single-sided or double-sided cutting inserts that have a high degree of circularity in axial cross-sectional views and/or axial end views.

U.S. Pat. No. 7,264,425 discloses a single-sided cutting insert in FIGS. 3A-3C thereof, which is circular in an axial end view and non-circular in an axial cross-sectional view, due to its adjusted clearance surface, and which is suitable for turning operations.

U.S. Pat. No. 7,677,145 discloses a double-sided cutting insert which is circular in both axial cross-sectional views and axial end views, and which is suitable for re-profiling railway vehicle wheels.

U.S. Pat. No. 8,371,774 discloses a single-sided cutting insert in FIGS. 1-4 thereof, which is circular in an axial end view and non-circular in an axial cross-sectional view, due to radial displacement of points along the cutting edge, and which is suitable for the longitudinal turning of flat faces.

SUMMARY OF THE INVENTION

In accordance with one aspect of the present invention, there is provided an indexable cutting insert comprising:
  opposing upper and lower end surfaces with a continuous peripheral side surface and a central axis extending therebetween,
  upper and lower peripheral edges formed at the intersection of the peripheral side surface and the upper and lower end surfaces, respectively, and
  a number N upper cutting edges formed on the upper peripheral edge, where N≥2,
    the peripheral side surface including:
      a continuous upper relief surface adjacent the upper peripheral edge which is non-circular in a cross-section taken in a first horizontal plane perpendicular to the central axis, and
      a continuous upper abutment surface spaced apart from the upper peripheral edge which is circular in a cross-section taken in a second horizontal plane perpendicular to the central axis,
  wherein:
  each upper cutting edge exhibits mirror symmetry about a bisector plane containing the central axis;
  in an end view of the cutting insert, the upper peripheral edge is non-circular and exhibits N-fold rotational symmetry about the central axis; and
  in a side view of the cutting insert, each upper cutting edge is non-linear.

In accordance with another aspect of the disclosed subject matter, there is provided an indexable cutting insert comprising:
  opposing upper and lower end surfaces with a continuous peripheral side surface and a central axis extending therebetween,
  upper and lower peripheral edges formed at the intersection of the peripheral side surface and the upper and lower end surfaces, respectively,
  a through bore coaxial with the central axis opening out to both the upper and lower end surfaces, the through bore having an upper bore surface and a lower bore surface, and
  a median plane perpendicular to the central axis intersecting the through bore, midway between the upper and lower end surfaces;
  wherein:
  a cross-sectional area of the through bore perpendicular to the central axis is larger at the median plane than at points along the central axis closer to the upper and lower end surfaces;
  the through bore and the peripheral side surface have inner and outer undercuts, respectively, with respect to an upward-downward direction parallel to the central axis; and
  the inner and outer undercuts are visible in cross-sections taken in mutually perpendicular first and second vertical planes containing the central axis.

Also disclosed is a cutting tool comprising:
  an insert holder having an insert receiving pocket formed in a front end thereof, the insert receiving pocket having a seat surface and a side wall transverse thereto, and
  an indexable cutting insert in accordance with the aforementioned second aspect removably secured in the insert receiving pocket by a clamping member,
  wherein:
    one of the insert's upper and lower end surfaces faces towards the seat surface,
    the clamping member makes contact with only one of the upper and lower bore surfaces at at least one inner contact zone; and
    the at least one inner contact zone is entirely located between the median plane and the seat surface.

BRIEF DESCRIPTION OF THE DRAWINGS

For a better understanding, the invention will now be described, by way of example only, with reference to the accompanying drawings in which chain-dash lines represent cut-off boundaries for partial views of a member and in which.

DETAILED DESCRIPTION OF THE INVENTION

Figure 1A:
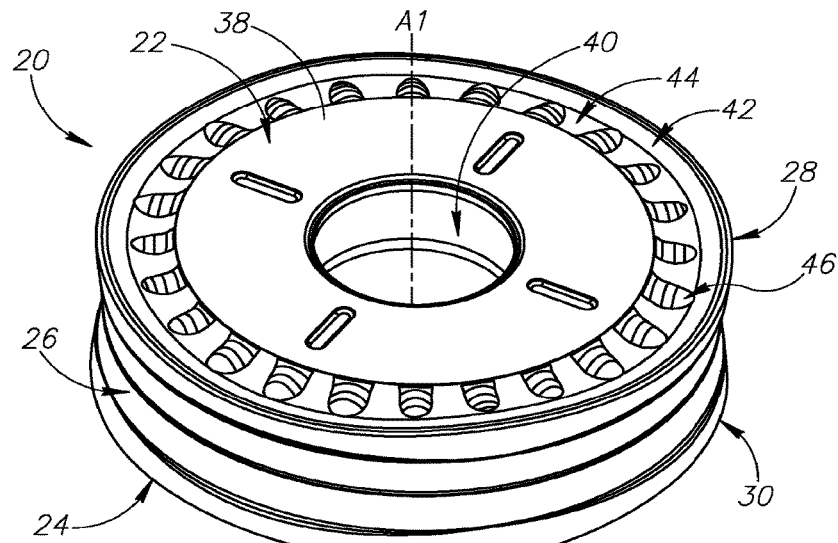
FIG. 1A is a perspective view of a cutting insert in accordance with a first embodiment of the present invention.

The present invention relates to an indexable cutting insert 20, 120, as shown in FIGS. 1A-1C and 2A-2C, having opposing upper and lower end surfaces 22, 24 with a continuous peripheral side surface 26 and a central axis A1 extending therebetween.

Upper and lower peripheral edges 28, 30 are formed at the intersection of the peripheral side surface 26 and the upper and lower end surfaces 22, 24, respectively.

In some embodiments of the present invention the cutting insert 20, 120 may be indexable about the central axis A1.

In some embodiments of the present invention, the cutting insert 20, 120 may preferably be manufactured by form pressing and sintering a cemented carbide, such as tungsten carbide, and may be coated or uncoated.

In a first aspect of the present invention, the peripheral side surface 26 includes a continuous upper relief surface 32 adjacent the upper peripheral edge 28 and a continuous upper abutment surface 34a spaced apart from the upper peripheral edge 28.

Figure 1B:
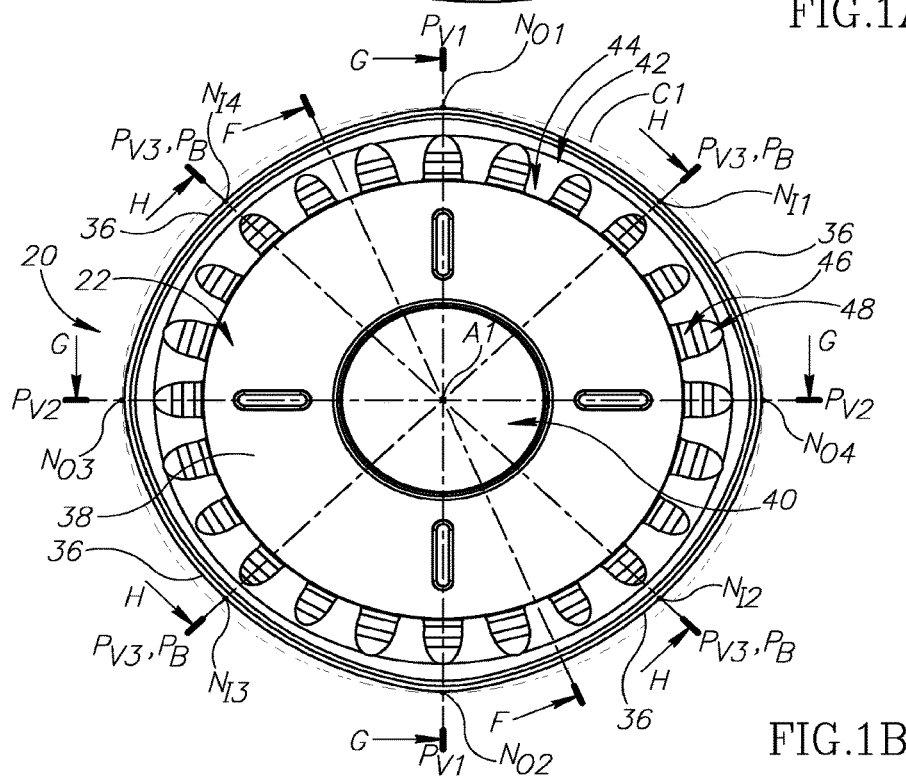
FIG. 1B is an end view of a cutting insert shown in FIG. 1A.
Figure 1C:
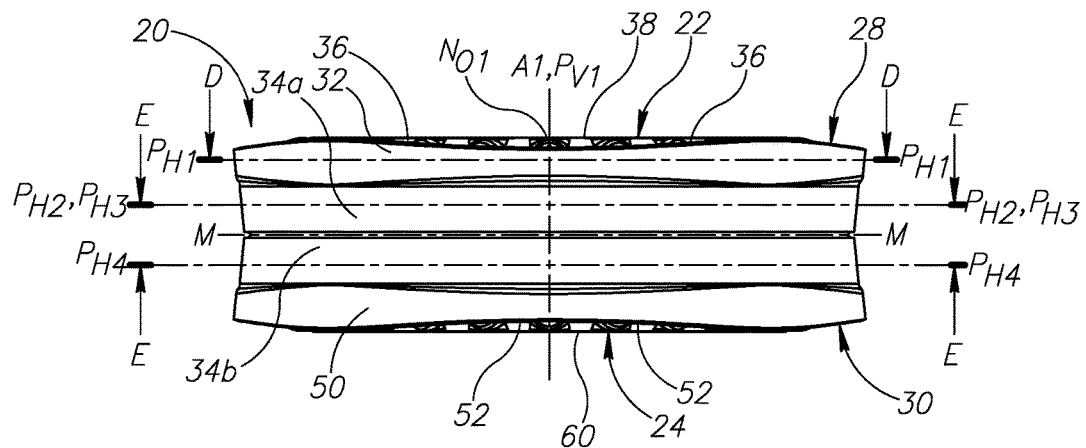
FIG. 1C is a side view of a cutting insert shown in FIG. 1A.
Figure 1D:
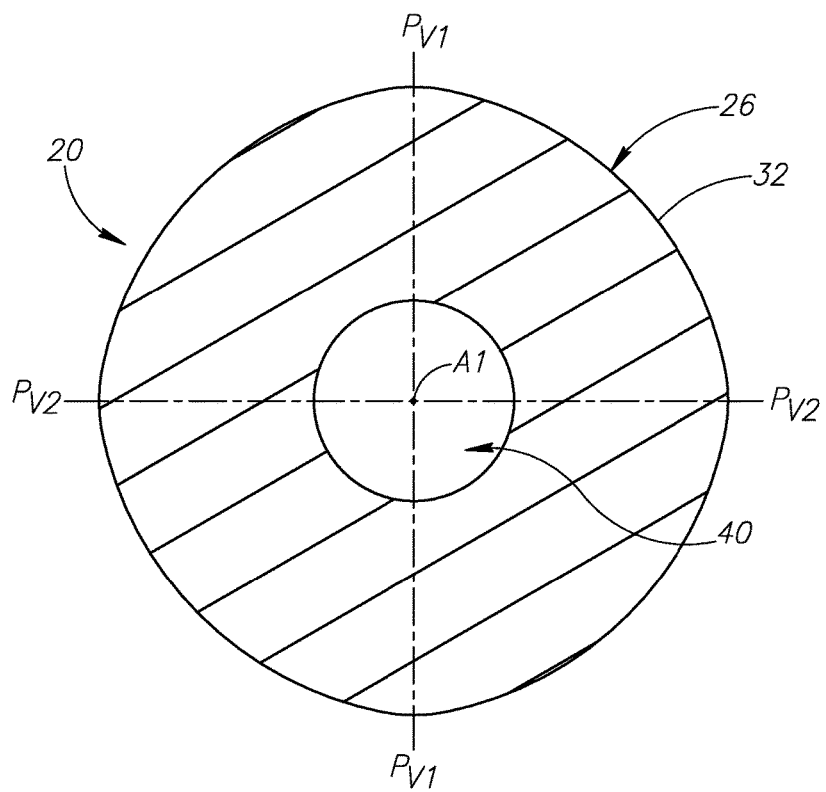
FIG. 1D is a cross-sectional cut view of the cutting insert shown in FIG. 1C, taken along the line D-D.
Figure 1E:
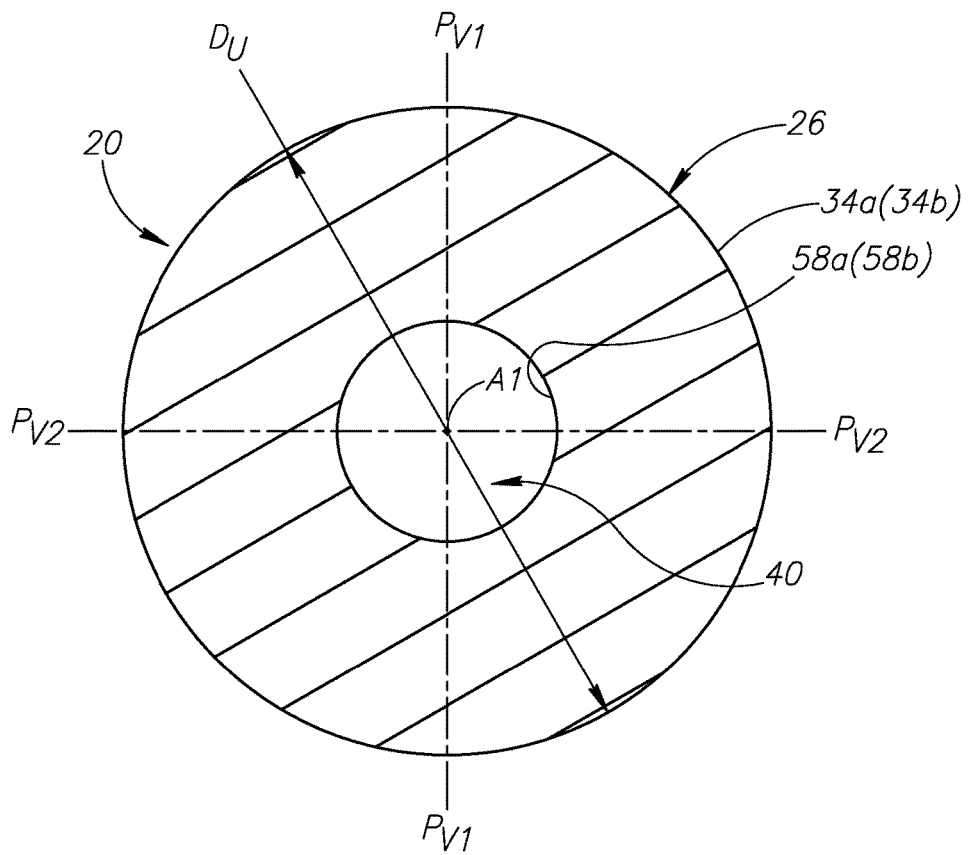
FIG. 1E is a cross-sectional cut view of the cutting insert shown in FIG. 1C, taken along the line E-E.
Figure 2A:
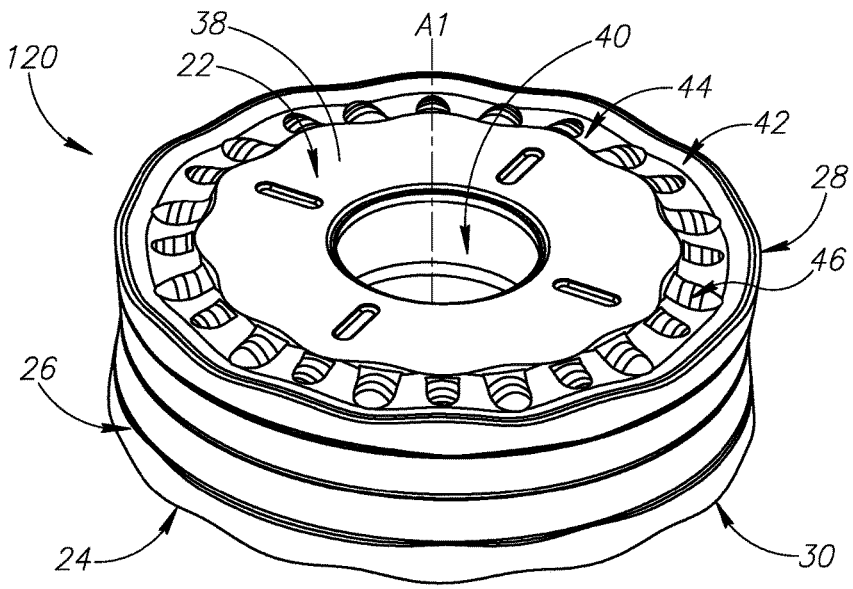
FIG. 2A is a perspective view of a cutting insert in accordance with a second embodiment of the present invention.
Figure 2B:
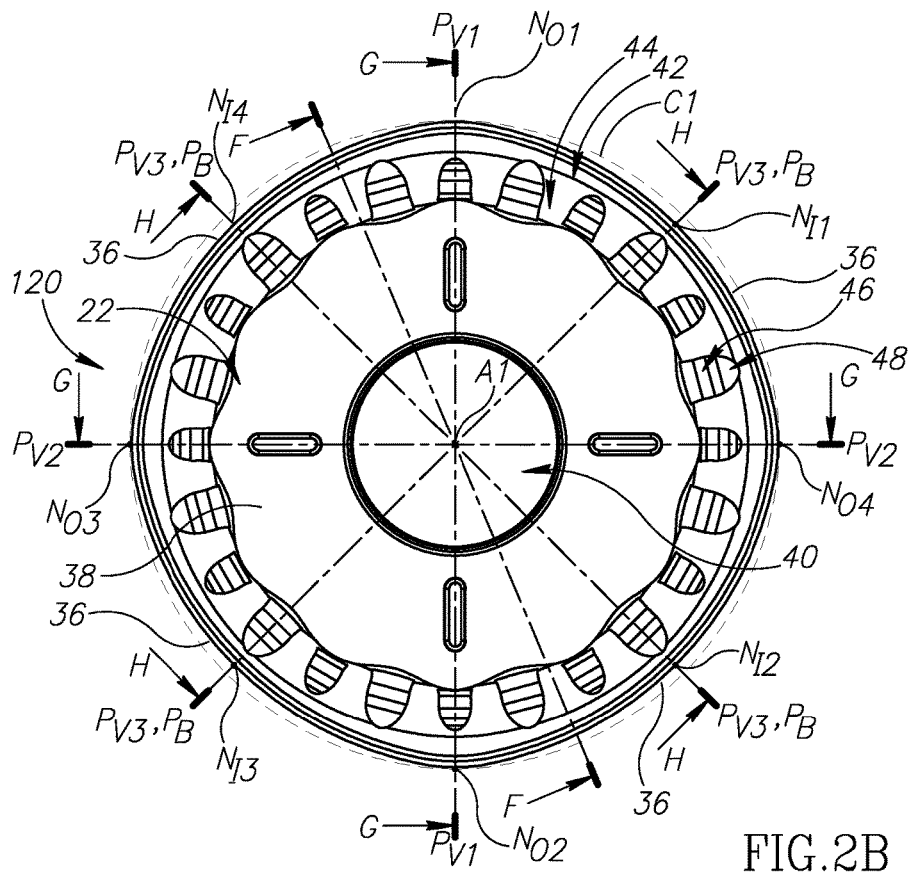
FIG. 2B is an end view of a cutting insert shown in FIG. 2A.
Figure 2C:
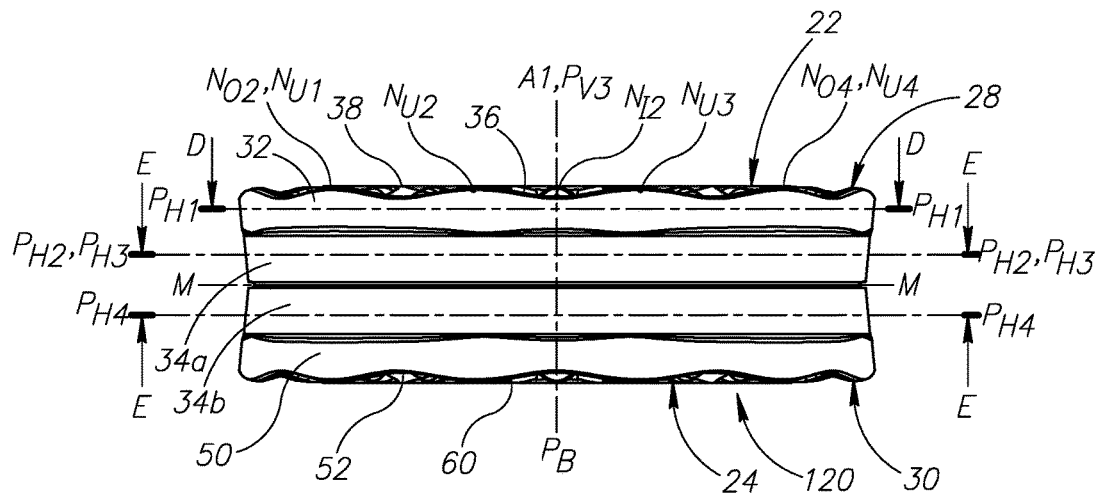
FIG. 2C is a side view of a cutting insert shown in FIG. 2A.
Figure 2D:
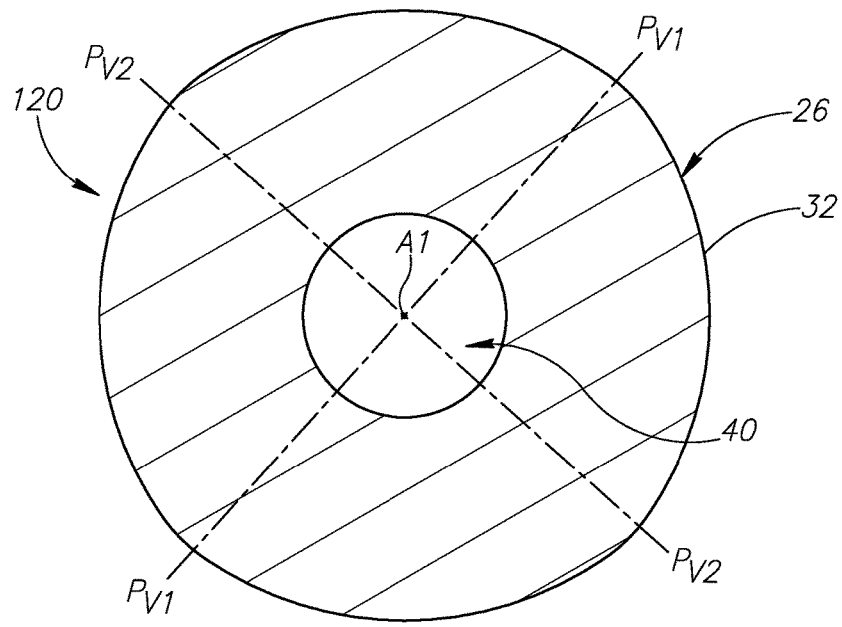
FIG. 2D is a cross-sectional cut view of the cutting insert shown in FIG. 2C, taken along the line D-D.
Figure 2E:
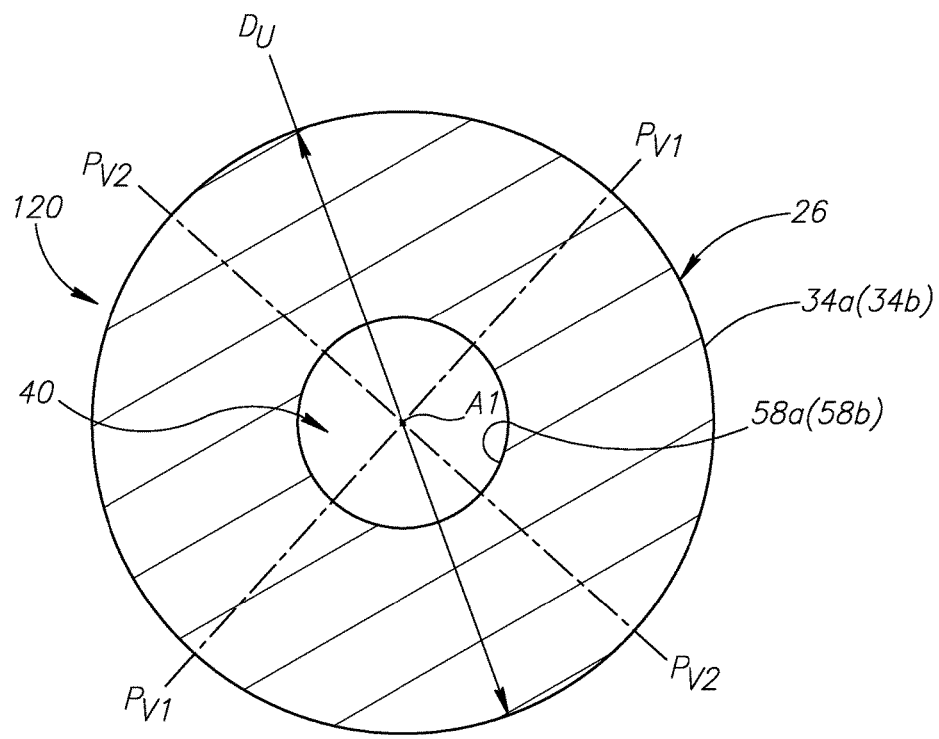
FIG. 2E is a cross-sectional cut view of the cutting insert shown in FIG. 2C, taken along the line E-E.

In the first aspect of the present invention, as shown in FIGS. 1D and 2D, the upper relief surface 32 is non-circular in a cross-section taken in a first horizontal plane $P_H1$ perpendicular to the central axis A1, and as shown in FIGS. 1E and 2E, the upper abutment surface 34a is circular in a cross-section taken in a second horizontal plane $P_H2$ perpendicular to the central axis A1.

It should be appreciated that the non-circularity of the upper relief surface 32 in FIGS. 1D and 2D has been exaggerated to provide an improved understanding of the invention.

Also in the first aspect of the present invention, a number N (N≥2) upper cutting edges 36 are formed on the upper peripheral edge 28, with each upper cutting edge 36 exhibiting mirror symmetry about a bisector plane $P_B$ containing the central axis A1.

As shown in FIGS. 1C and 2C, in a side view of the cutting insert 20, 120, each upper cutting edge 36 is non-linear.

As shown in FIGS. 1B and 2B, in an end view of the cutting insert 20, 120, the upper peripheral edge 28 is non-circular and exhibits N-fold rotational symmetry about the central axis A1, thus providing the cutting insert 20, 120 with N index positions.

It should be appreciated that the non-circularity of the upper peripheral edge 28 in FIGS. 1B and 2B has been exaggerated to provide an improved understanding of the invention.

Figure 4:
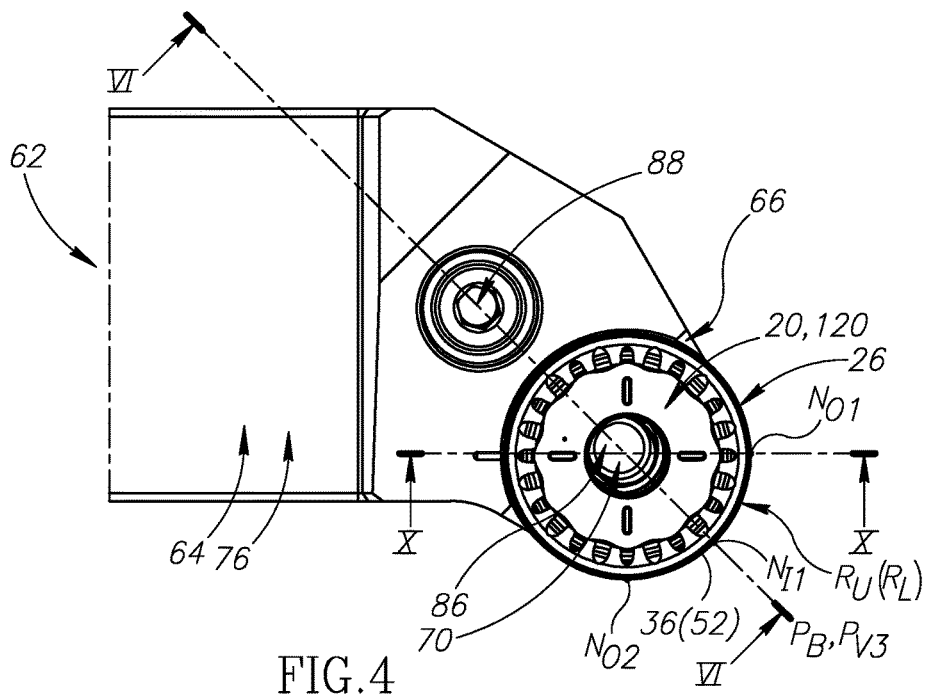
FIG. 4 is a top view of the cutting tool shown in FIG. 3.

Although the upper peripheral edge 28 is non-circular in an end view of the cutting insert 20, 120, by tilting the cutting insert 20, 120 in one of the bisector planes $P_B$, as shown in FIG. 4, the associated operative upper cutting edge 36 may present a substantially constant upper radius of curvature $R_U$ to engage a rotating workpiece, making the cutting insert 20, 120 particularly suitable for re-profiling railway vehicle wheels.

As shown in FIGS. 1B and 2B, in an end view of the cutting insert 20, 120, a first imaginary circle C1 may circumscribe the upper peripheral edge 28 at N discrete radially outermost points No1, No2, No3, No4.

In some embodiments of the present invention, the upper radius of curvature $R_U$ may be greater than the radius of the first imaginary circle C1.

Also in some embodiments of the present invention, the upper radius of curvature $R_U$ may be no more than 5% greater than the radius of the first imaginary circle C1.

Further in some embodiments of the present invention, each upper cutting edge 36 may extend between two of the N radially outermost points No1, No2, No3, No4.

Yet further in some embodiments of the present invention, any two circumferentially adjacent upper cutting edges 36 may merge at one of the N radially outermost points No1, No2, No3, No4, and the two end points of each upper cutting edge 36 may be coincident with two of the N radially outermost points No1, No2, No3, No4.

When considering the cutting insert 20 in a first embodiment of the present invention, as shown in FIG. 1C, the N radially outermost points No1, No2, No3, No4 may be located closer to the second horizontal plane $P_H2$ than any other point on the upper peripheral edge 28.

By virtue of the N radially outermost points No1, No2, No3, No4 being located closer to the second horizontal plane $P_H2$ than any other point on the upper peripheral edge 28, the height of each upper cutting edge 36 increases as it extends from each of its two end points towards its associated bisector plane $P_B$, such that the operative upper cutting edge 36 advantageously directs cutting chips away from the rotating workpiece.

When considering the cutting insert 120 in a second embodiment of the present invention, as shown in FIG. 2C, each upper cutting edge 36 may have a plurality of discrete axially uppermost points Nu1, Nu2, Nu3, Nu4 located further from the second horizontal plane $P_H2$ than any other point on the said upper cutting edge 36.

Also in the second embodiment of the present invention, two of the axially uppermost points Nu1, Nu4 of each upper cutting edge 36 may be coincident with two of the N radially outermost points No1, No2, No3, No4.

As shown in FIG. 2C, in a side view of the cutting insert 120, each upper cutting edge 36 may be wave shaped.

By virtue of each upper cutting edge 36 having a plurality of discrete axially uppermost points Nu1, Nu2, Nu3, Nu4 and being wave shaped, enables cutting operations to be performed with a relatively low cutting force and improves chip breakage and removal.

It should be appreciated that apart from instances of specific reference to either the first or second embodiments of the invention, the description and claims is applicable to some embodiments of the present invention, which includes both the first and second embodiments of the present invention.

In some embodiments of the present invention, each upper cutting edge 36 may circumferentially extend 360/N° along the upper peripheral edge 28.

Also in some embodiments of the present invention, the upper peripheral edge 28 may have exactly four upper cutting edges 36, and N=4.

As shown in FIGS. 1B and 2B, in an end view of the cutting insert 20, 120, each upper cutting edge 36 may be non-linear.

Also as shown in FIGS. 1B and 2B, in an end view of the cutting insert 20, 120, each upper cutting edge 36 may be outwardly convex in relation to the central axis A1.

In some embodiments of the present invention, any point on the upper peripheral edge 28 may be located further from the central axis A1 than any point on the upper abutment surface 34a.

Also in some embodiments of the present invention, the upper peripheral edge 28 may have N radially innermost points $N_I1$, $N_I2$, $N_I3$, $N_I4$, each contained in at least one of the bisector planes $P_B$.

As shown in FIGS. 1C, 1E and 2C, 2E, the upper abutment surface 34a may be conical, having an upper abutment diameter $D_U$ which decreases in a direction away from the upper end surface 22.

Also as shown in FIGS. 1C and 2C, the upper end surface 22 may include a planar upper support surface 38, and the upper peripheral edge 28 may be entirely located closer to the second horizontal plane $P_H2$ than the upper support surface 38.

In some embodiments of the present invention, a through bore 40 coaxial with the central axis A1 may open out to the upper support surface 38.

As shown in FIGS. 1A, 1B and 2A, 2B, the upper end surface 22 may include a continuous rake surface 42 adjacent to the upper peripheral edge 28 and a ramp surface 44 adjacent to the upper support surface 38.

Figure 1F:
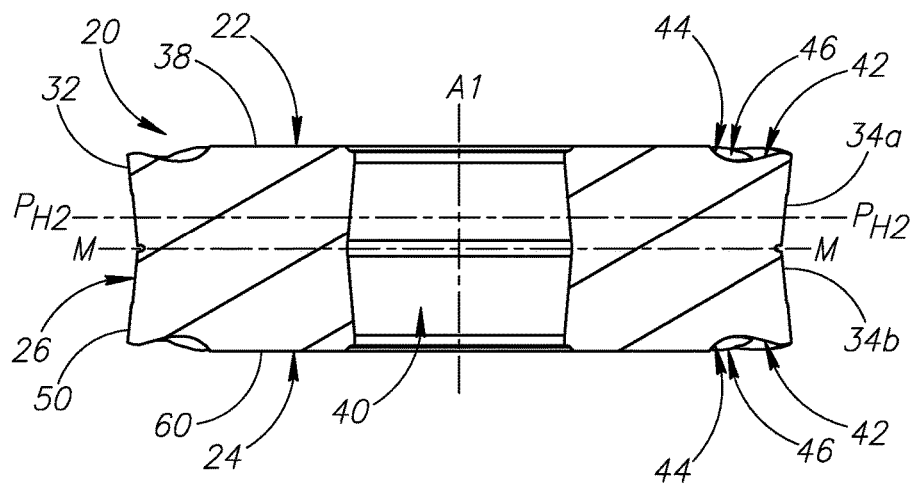
FIG. 1F is a cross-sectional view of the cutting insert shown in FIG. 1B, taken along the line F-F.
Figure 2F:
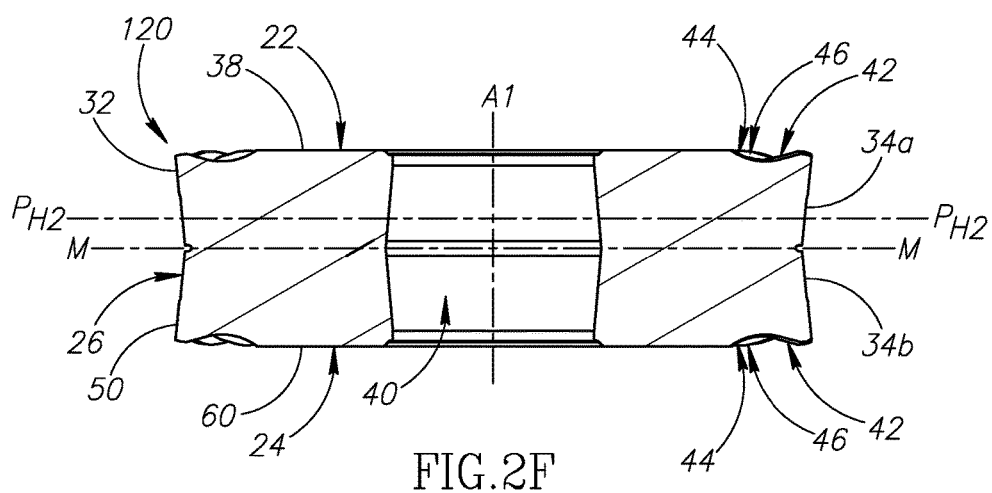
FIG. 2F is a cross-sectional view of the cutting insert shown in FIG. 2B, taken along the line F-F.

In some embodiments of the present invention, as shown in FIGS. 1F and 2F, the rake surface 42 may extend radially inwardly towards the second horizontal plane $P_H2$, and the ramp surface 44 may extend radially outwardly towards the second horizontal plane $P_H2$.

Also in some embodiments of the present invention, as shown in FIGS. 1A, 1B and 2A, 2B, the ramp surface 44 may be interrupted by a plurality of circumferentially spaced apart protrusions 46.

Further in some embodiments of the present invention, each of the protrusions 46 may be partially located on the rake surface 42.

As shown in FIGS. 1B and 2B, in an end view of the cutting insert 20, 120, each of the protrusions 46 may include a convex shaped radially outer portion 48.

In some embodiments of the present invention, the plurality of protrusions 46 may be greater in number than the plurality of N upper cutting edges 36.

Also in some embodiments of the present invention, the plurality of protrusions 46 may be greater in number, by at least a factor of six, than the plurality of N upper cutting edges 36.

As shown in FIGS. 1C and 2C, the peripheral side surface 26 may include a continuous lower relief surface 50 adjacent the lower peripheral edge 30 and a continuous lower abutment surface 34b spaced apart from the lower peripheral edge 30.

In some embodiments of the present invention, the lower relief surface 50 may be identical to the upper relief surface 32, and the lower abutment surface 34b may be identical to upper abutment surface 34a.

Also in some embodiments of the present invention, the lower peripheral edge 30 may be identical to the upper peripheral edge 28, having a plurality of N lower cutting edges 52 formed thereon, and the cutting insert 20, 120 may be described as 'double-sided' having a total of N*2 upper and lower cutting edges 36, 52.

On reversing the 'double-sided' cutting insert 20, 120 and tilting the cutting insert 20, 120 in one of the bisector planes $P_B$, as shown in FIG. 4, the associated operative lower cutting edge 52 may present a substantially constant lower radius of curvature $R_L$ to engage the rotating workpiece.

By tilting the 'double-sided' cutting insert 20, 120 sufficient clearance is provided between the peripheral side surface 26 and the rotating workpiece.

In some embodiments of the present invention, the lower radius of curvature $R_L$ may be equal to the upper radius of curvature $R_U$.

As shown in FIGS. 1F-1H and 2F-2H, a median plane M perpendicular to the central axis A1 may intersect the through bore 40.

In some embodiments of the present invention, the median plane M may be located midway between the upper and lower end surfaces 22, 24.

Also in some embodiments of the present invention, the through bore 40 may exhibit mirror symmetry about the median plane M.

Further in some embodiments of the present invention, the peripheral side surface 26 may exhibit mirror symmetry about the median plane M.

Yet further in some embodiments of the present invention, the cutting insert 20, 120 may exhibit mirror symmetry about the median plane M, and the upper relief and upper abutment surfaces 32, 34a may be located between the upper end surface 22 and the median plane M.

In a second aspect of the present invention, the through bore 40 opens out to both the upper and lower end surfaces 22, 24.

Also in the second aspect of the present invention, the through bore 40 and the peripheral side surface 26 have inner and outer undercuts 54, 56, respectively, with respect to an upward-downward direction $D_{UD}$ parallel to the central axis A1.

Figure 1G:
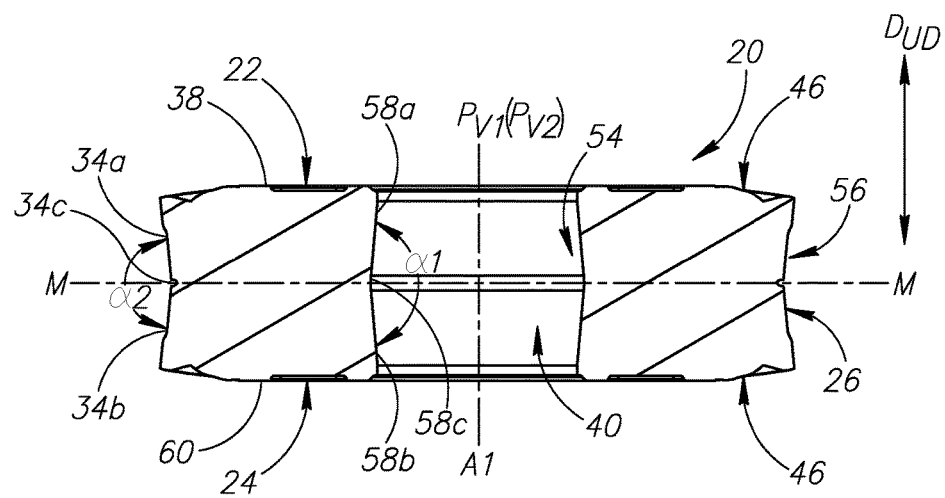
FIG. 1G is a cross-sectional view of the cutting insert shown in FIG. 1B, taken along the line G-G.
Figure 2G:
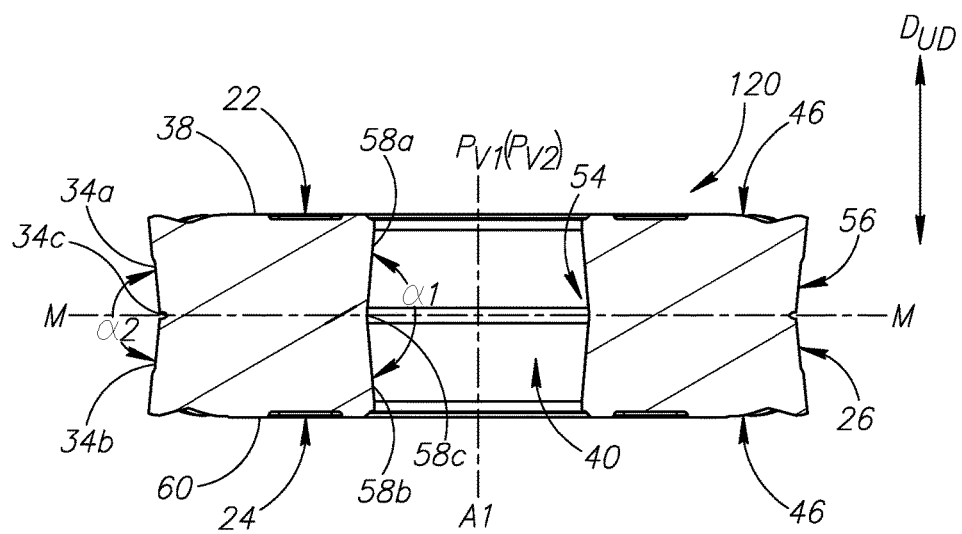
FIG. 2G is a cross-sectional view of the cutting insert shown in FIG. 2B, taken along the line G-G.

Further in the second aspect of the present invention, as shown in FIGS. 1G and 2G, the inner and outer undercuts 54, 56 are visible in the cross-sections taken in mutually perpendicular first and second vertical planes Pv1, Pv2 containing the central axis A1.

It should be appreciated that use of the term "undercut" throughout the description and claims refers to a recess or passage, where a straight line extending in the upward-downward direction $D_{UD}$ from a given sub-surface of the recess or passage intersects another sub-surface of the same recess or passage.

Figure 1H:
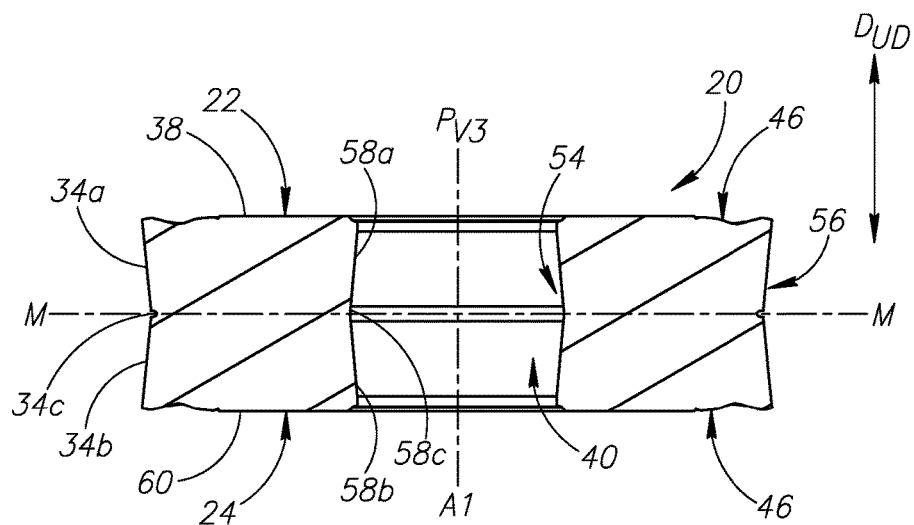
FIG. 1H is a cross-sectional view of the cutting insert shown in FIG. 1B, taken along the line H-H.
Figure 2H:
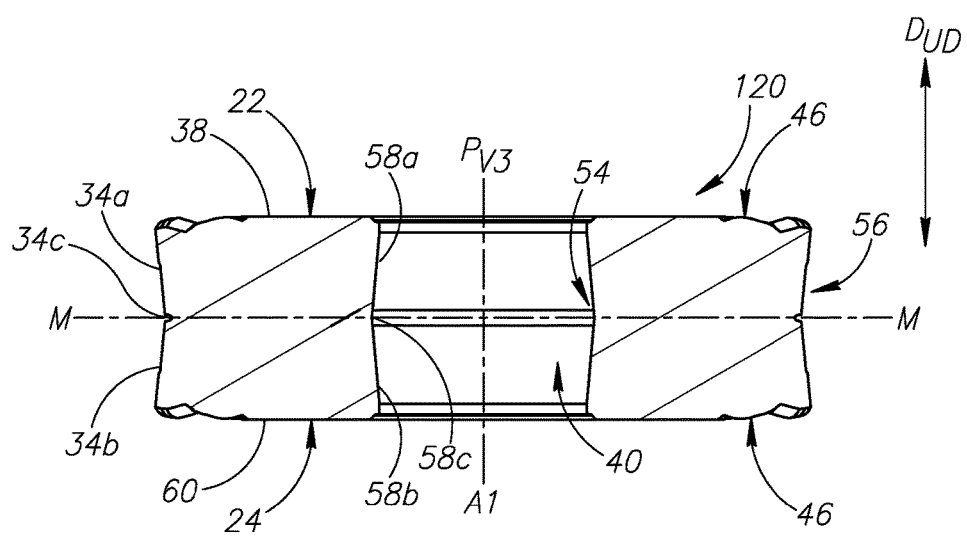
FIG. 2H is a cross-sectional view of the cutting insert shown in FIG. 2B, taken along the line H-H.

As shown in FIGS. 1H and 2H, the inner and outer undercuts 54, 56 may also be visible in a cross-section taken in a third vertical plane Pv3 containing the central axis A1 and bisecting the first and second vertical planes Pv1, Pv2.

In some embodiments of the present invention, the inner and outer undercuts 54, 56 may be visible in a cross-section taken in any plane containing the central axis A1.

As shown in FIGS. 1G and 2G, in the cross-sections taken in the first and second vertical planes Pv1, Pv2, the through bore 40 may exhibit mirror symmetry about the second and first vertical planes Pv2, Pv1, respectively.

In some embodiments of the present invention, the inner undercut 54 may be formed by upper and lower bore surfaces 58a, 58b of the through bore 40, and the upper and lower bore surfaces 58a, 58b may be entirely located on opposite sides of the median plane M.

Also in some embodiments of the present invention, the upper and lower bore surfaces 58a, 58b may be spaced apart from one another by a median bore surface 58c.

As shown in FIGS. 1E and 2E, the upper and lower bore surfaces 58a, 58b may be circular in cross-sections taken in third and fourth horizontal planes $P_H3$, $P_H4$, respectively, perpendicular to the central axis A1.

In some embodiments of the present invention, the second and third horizontal planes $P_H2$, $P_H3$ may be coplanar.

In other embodiments of the present invention (not shown), the first and third horizontal planes $P_H1$, $P_H3$ may be coplanar.

As shown in FIGS. 1G and 2G, in the cross-sections taken in the first and second vertical planes Pv1, Pv2, the upper and lower bore surfaces 58a, 58b may form a V-shape.

Also shown in FIGS. 1G and 2G, in the cross-sections taken in the first and second vertical planes Pv1, Pv2, the upper and lower bore surfaces 58a, 58b may form an external obtuse bore angle α1.

It should be appreciated that use of the term "external angle" throughout the description and claims refers to an angle between two surface components as measured external to the member on which these components are formed.

In some embodiments of the present invention, the obtuse bore angle α1 may have a value equal to or greater than 160°.

Also as shown in FIGS. 1G and 2G, in the cross-sections taken in the first and second vertical planes Pv1, Pv2, the peripheral side surface 26 may exhibit mirror symmetry about the second and first vertical planes Pv2, Pv1, respectively.

In some embodiments of the present invention, the outer undercut 56 may be formed by the upper and lower abutment surfaces 34a, 34b, and the upper and lower abutment surfaces 34a, 34b may be entirely located on opposite sides of the median plane M.

Also in some embodiments of the present invention, the upper and lower abutment surfaces 34a, 34b may be spaced apart by a median peripheral surface 34c.

As shown in FIGS. 1G and 2G, in the cross-sections taken in the first and second vertical planes Pv1, Pv2, the upper and lower abutment surfaces 34a, 34b may form a V-shape.

In some embodiments of the present invention, in a cross-section taken in any plane containing the central axis A1, the upper and lower abutment surfaces 34a, 34b may form a V-shape.

As shown in FIGS. 1G and 2G, in the cross-sections taken in the first and second vertical planes Pv1, Pv2, the upper and lower abutment surfaces 34a, 34b may form an external obtuse abutment angle α2.

In some embodiments of the present invention, the obtuse abutment angle α2 may have a value equal to or greater than 160°.

Also in some embodiments of the present invention, both the upper and lower end surfaces 22, 24 may include planar upper and lower support surfaces 38, 60, respectively, and the through bore 40 may open out to the upper and lower support surfaces 38, 60.

As shown in FIGS. 1C and 2C, the upper and lower peripheral edges 28, 30 may be entirely located closer to the median plane M than the upper and lower support surfaces 38, 60, respectively.

In some embodiments of the present invention, the upper and lower support surfaces 38, 60 may be perpendicular to the central axis A1.

Figure 3:
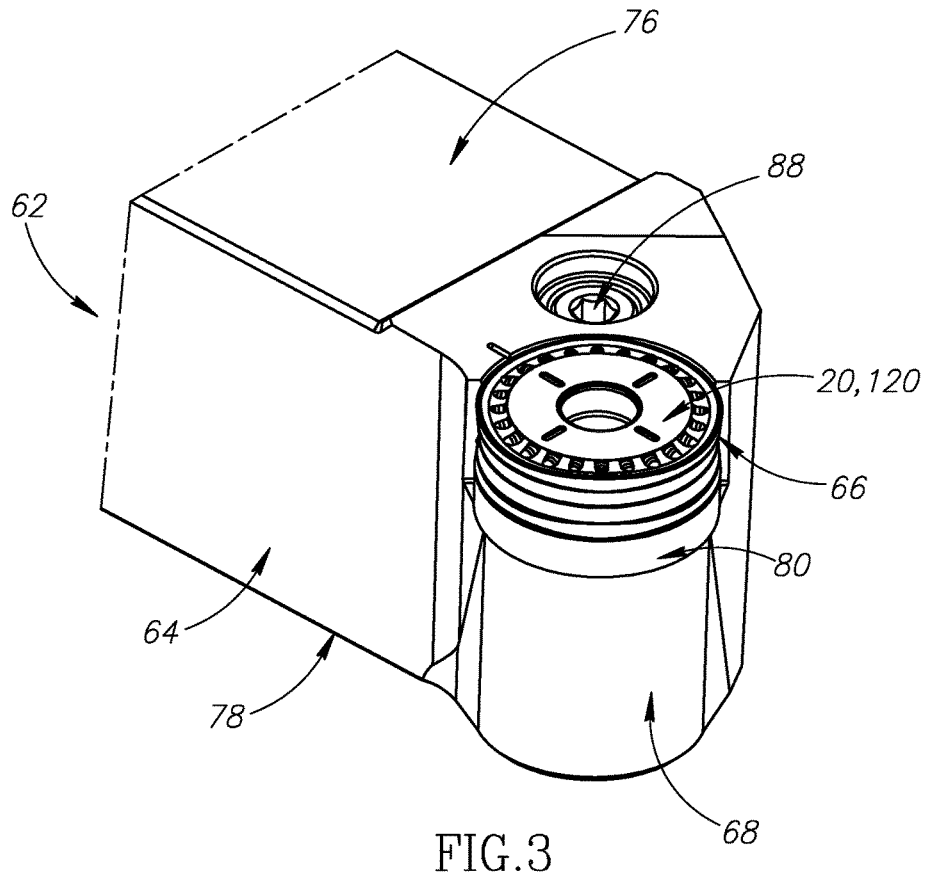
FIG. 3 is a perspective view of a cutting tool in accordance with some embodiments of the present invention.
Figure 5:
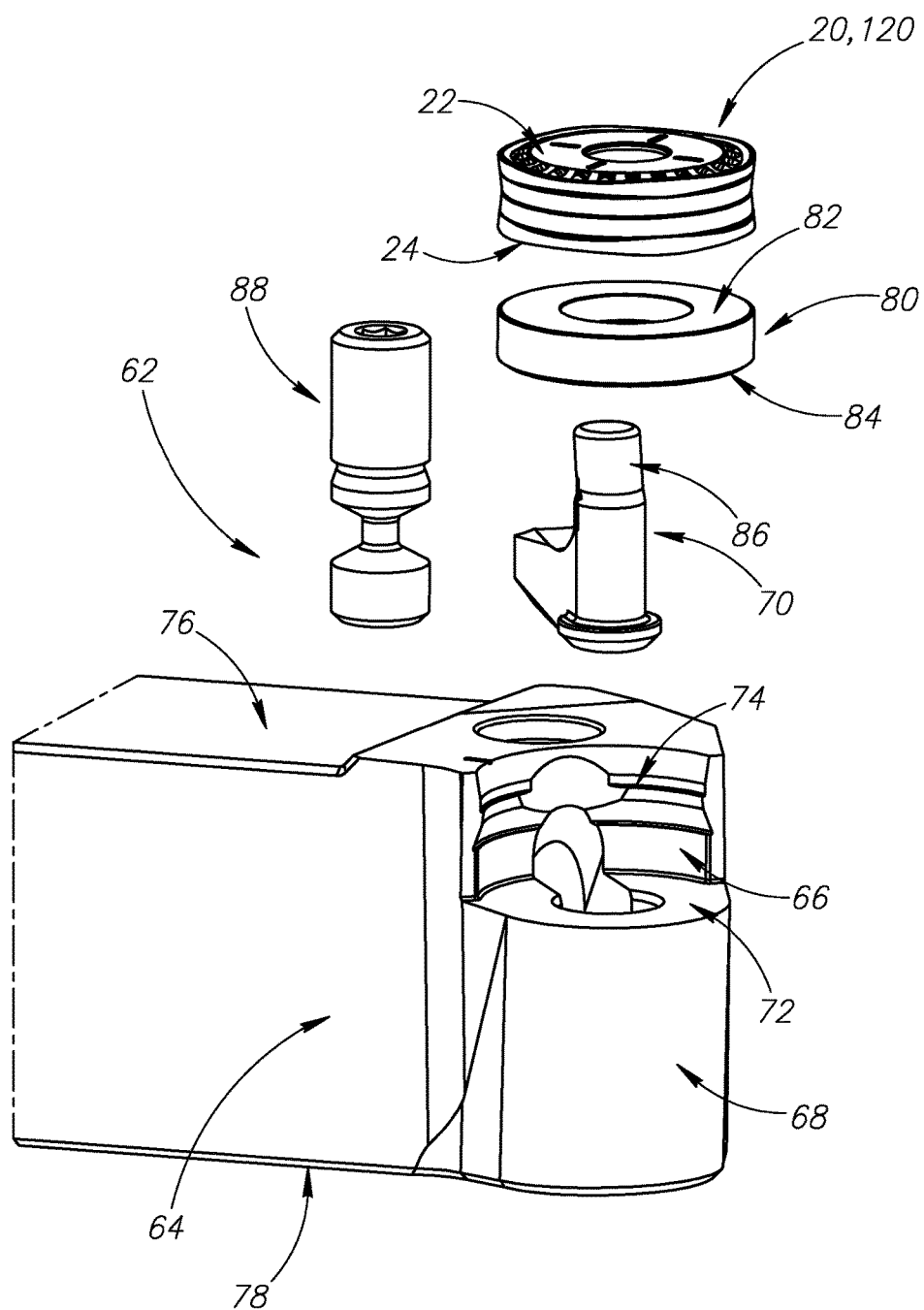
FIG. 5 is an exploded perspective view of the cutting tool shown in FIG. 3.

As shown in FIGS. 3 to 5, the second aspect of the present invention also relates to a cutting tool 62 having an insert holder 64 with an insert receiving pocket 66 formed in a front end 68 thereof, and the cutting insert 20, 120 removably secured in the insert receiving pocket 66 by a clamping member 70.

In the second aspect of the present invention, the insert receiving pocket 66 has a seat surface 72 and a side wall 74 transverse thereto, and one of the upper and lower end surfaces 22, 24 faces towards the seat surface 72.

Figure 6:
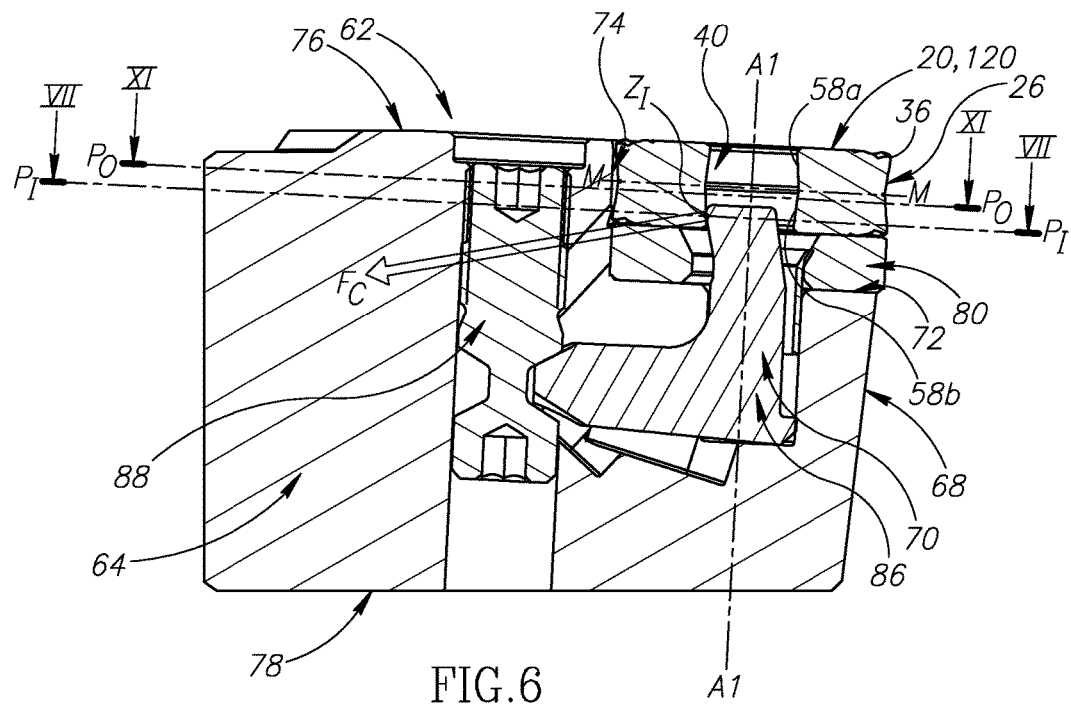
FIG. 6 is a cross-sectional view of the cutting tool shown in FIG. 5, taken along the line VI-VI.

In some embodiments of the present invention, as shown in FIG. 6, the seat surface 72 may be planar, and the median plane M may be parallel to the seat surface 72.

Also in some embodiments of the present invention, only one of the upper and lower cutting edges 36, 52 may be operative, and the operative upper or lower cutting edge 36, 52 may be associated with the one of the upper and lower end surfaces 22, 24 facing away from the seat surface 72.

In the second aspect of the present invention, as shown in FIG. 6, the clamping member 70 makes contact with only one of the upper and lower bore surfaces 58a, 58b at at least one inner contact zone $Z_I$, and the at least one inner contact zone $Z_I$ is entirely located between the median plane M and the seat surface 72.

Figure 7:
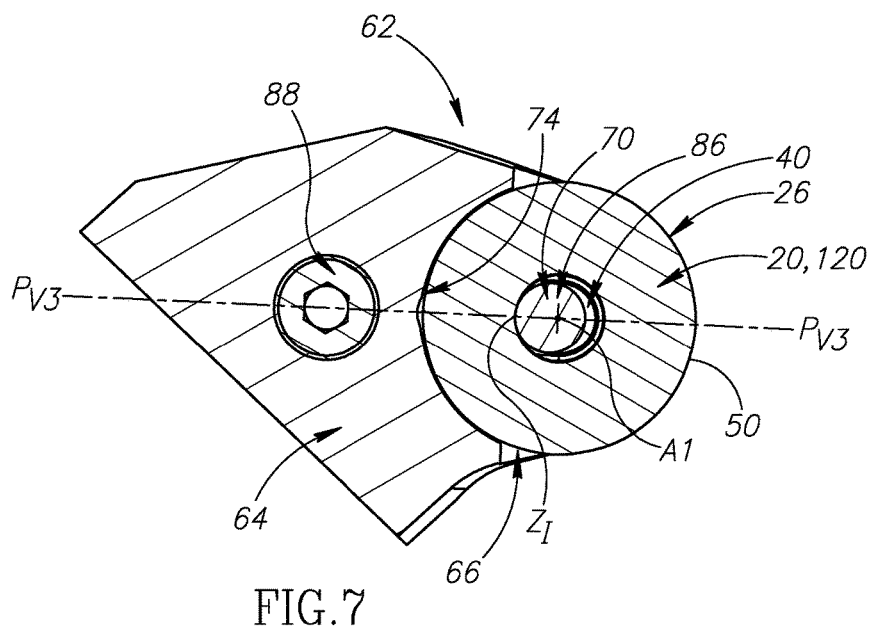
FIG. 7 is a cross-sectional view of the cutting tool shown in FIG. 6, taken along the line VII-VII.

As shown in FIG. 7, in a cross-section taken in an inner contact plane $P_I$ intersecting the at least one inner contact zone $Z_I$ and perpendicular to the central axis A1, the through bore 40 may be circular.

Also as shown in FIG. 7, the peripheral side surface 26 may not make contact with the side wall 74 in the cross-section taken in the inner contact plane $P_I$.

In some embodiments of the present invention, the clamping member 70 may make contact with one of the upper and lower bore surfaces 58a, 58b at a single inner contact zone $Z_I$, and the third vertical plane Pv3, bisecting the first and second vertical planes Pv1, Pv2, may intersect the single inner contact zone $Z_I$ and the side wall 74.

As shown in FIG. 6, in the cross-section taken in the third vertical plane Pv3, the upper and lower bore surfaces 58a, 58b may form a V-shape.

By virtue of the upper and lower bore surfaces 58a, 58b forming a V-shape in the cross-section taken in the third vertical plane Pv3, a clamping force $F_C$ exerted at the inner contact zone $Z_I$ by the clamping member 70 may advantageously have a vertical component directed towards the seat surface 72, thus ensuring firm and stable clamping.

In some embodiments of the present invention, the insert holder 64 may have opposing top and bottom holder surfaces 76, 78, and the insert receiving pocket 66 may be located adjacent to the top holder surface 76.

Also in some embodiments of the present invention, the bottom holder surface 78 may be planar, and the central axis A1 may intersect the bottom holder surface 78 and be non-perpendicular thereto.

Figure 8:
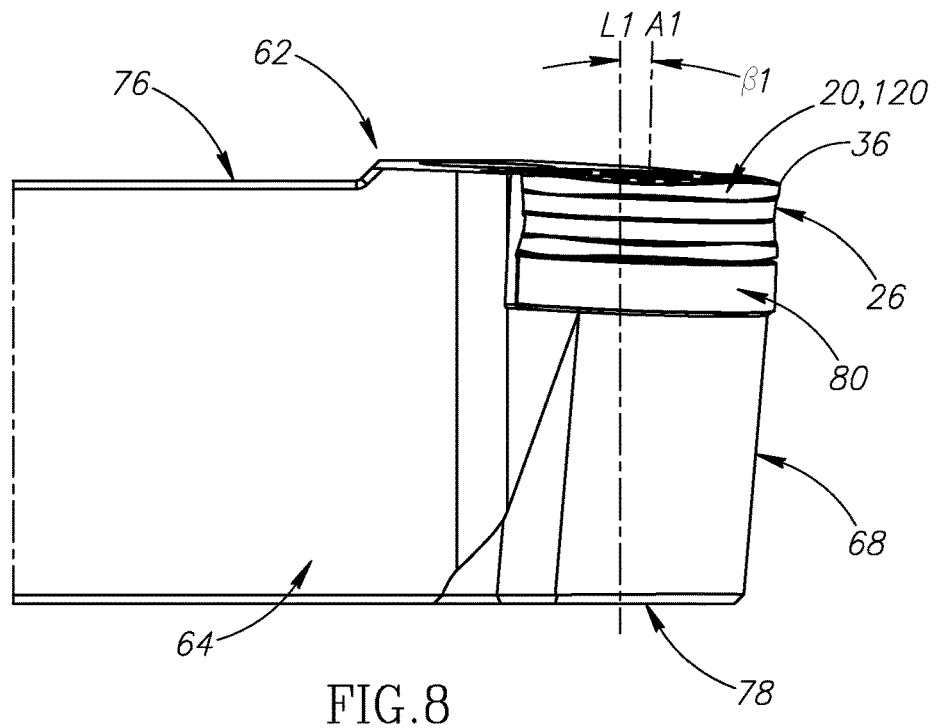
FIG. 8 is a side view of the cutting tool shown in FIG. 3.
Figure 9:
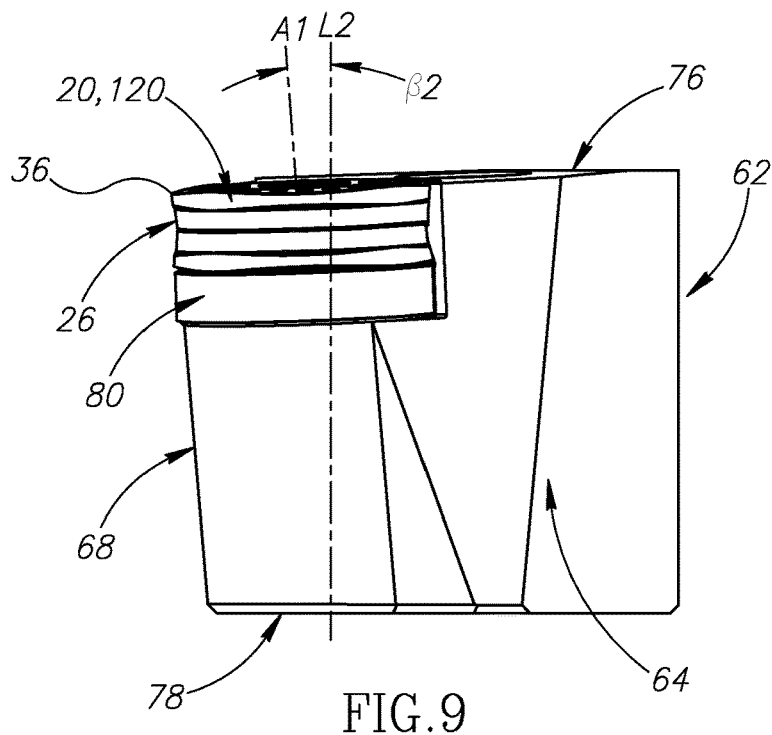
FIG. 9 is a front view of the cutting tool shown in FIG. 3.

As shown in FIGS. 8 and 9, in side and front views of the cutting tool 62, the central axis A1 may form first and second inclination angles β1, β2, respectively, with first and second imaginary straight lines L1, L2 perpendicular to the bottom holder surface 78.

In some embodiments of the present invention, the first and second inclination angles β1, β2 may have equal values of between 1 and 3 degrees.

Also in some embodiments of the present invention, the first and second inclination angles β1, β2 may correspond to the extent of tilting of the cutting insert 20, 120, required for the operative upper or lower cutting edge 36, 52 to present substantially constant radii of curvature $R_U$, $R_L$ to engage the rotating workpiece.

In some embodiments of the present invention, only one of the upper and lower abutment surfaces 34a, 34b may make contact with the side wall 74 of the insert receiving pocket 66 at two spaced apart outer contact zones Zo1, Zo2, and the two outer contact zones Zo1, Zo2 may be entirely located between the median plane M and the seat surface 72.

Figure 10:
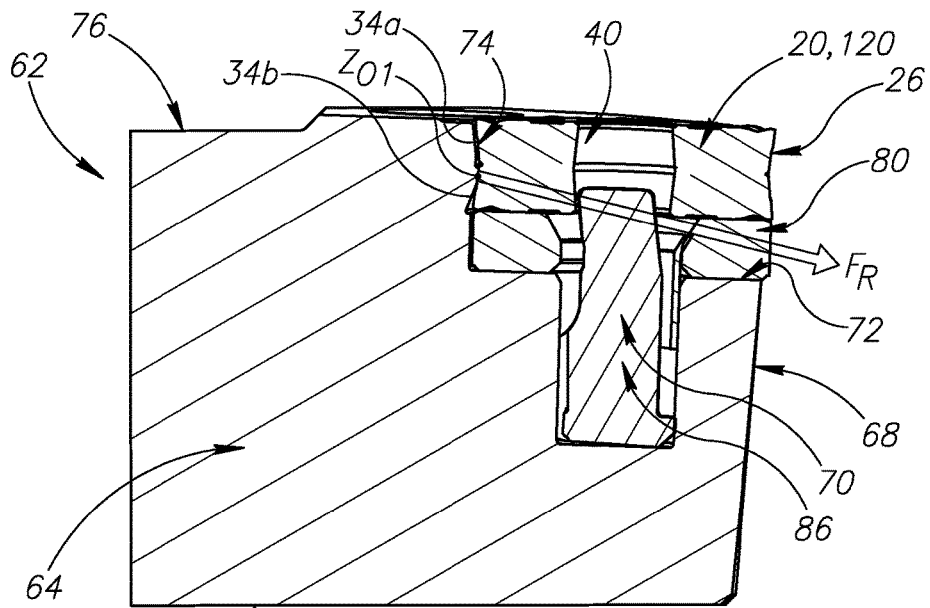
FIG. 10 is a cross-sectional view of the cutting tool shown in FIG. 5, taken along the line X-X.
Figure 11:
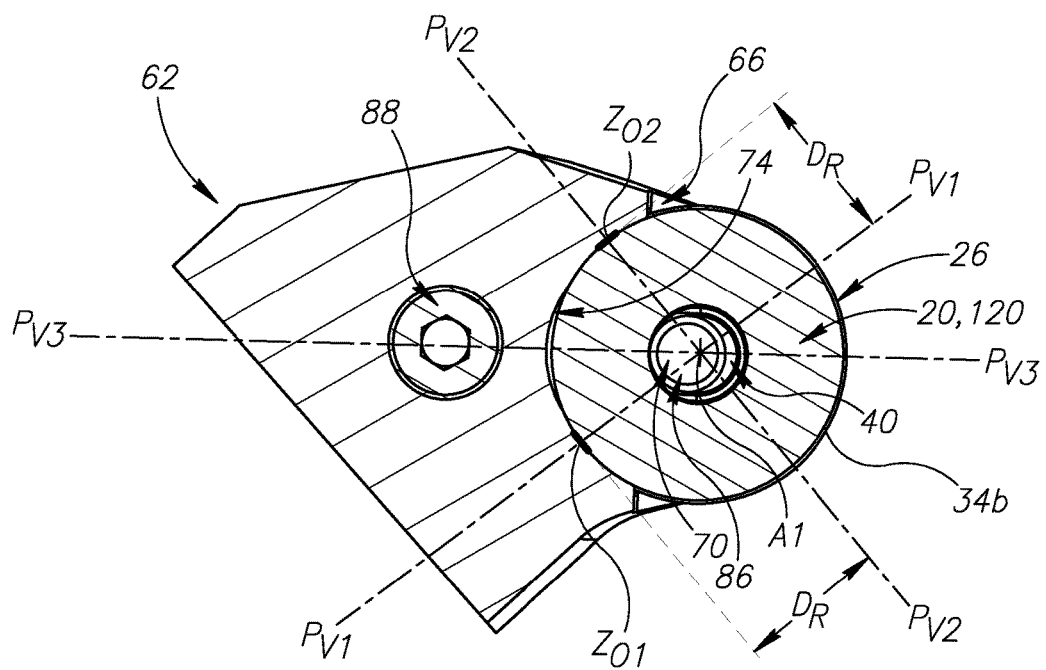
FIG. 11 is a cross-sectional view of the cutting tool shown in FIG. 6, taken along the line XI-XI.

As shown in FIGS. 10 and 11, the two outer contact zones Zo1, Zo2 may be comprised of first and second outer contact zones Zo1, Zo2, and the first and second vertical planes Pv1, Pv2 may intersect the first and second outer contact zones Zo1, Zo2, respectively.

By virtue of the upper and lower abutment surfaces 34a, 34b forming a V-shape in the cross-sections taken in the first and second vertical planes Pv1, Pv2, reaction forces $F_R$ at the two outer contact zones Zo1, Zo2, directed away from the side wall 74 of the insert receiving pocket 66, may advantageously have vertical components directed towards the seat surface 72, thus ensuring firm and stable clamping.

As shown in FIG. 11, in a cross-section taken in an outer contact plane $P_O$ intersecting the two outer contact zones Zo1, Zo2 and perpendicular to the central axis A1, the two outer contact zones Zo1, Zo2 may be located an equal radial contact distance DR from the central axis A1.

Also as shown in FIG. 11, the peripheral side surface 26 may be circular in the cross-section taken in the outer contact plane $P_O$, enabling the cutting insert 20, 120 to be indexed about the central axis A1 without being removed from the insert receiving pocket 66.

Further as shown in FIG. 11, the clamping member 70 may not make contact with the through bore 40 in the cross-section taken in the outer contact plane $P_O$.

In some embodiments of the present invention, the inner contact plane $P_I$ may be located closer to the seat surface 72 than the outer contact plane $P_O$, thus ensuring that any moment of force, resulting from the clamping force $F_C$ and the reaction forces $F_R$, urges the cutting insert 20, 120 towards the seat surface 72.

Visual markings adjacent the upper and lower cutting edges 36, 52, and a visual reference marking on the insert holder 64, may be provided to assist an operator when indexing the cutting insert 20, 120.

In some embodiments of the present invention, a shim 80 having opposing top and bottom shim surfaces 82, 84 may be located between the cutting insert 20, 120 and the seat surface 72.

As shown in FIG. 5, the one of the upper and lower end surfaces 22, 24 facing towards the seat surface 72 makes contact with the top shim surface 82, and the bottom shim surface 84 makes contact with the seat surface 72.

In some embodiments of the present invention, the clamping member 70 may be non-threadingly retained in the insert holder 64.

Also in some embodiments of the present invention, the clamping member 70 may be in the form of a clamping lever 86 operatively connected to an actuating member 88.

As shown in FIG. 6, the actuating member 88 may be threadingly retained in the insert holder 64 and not make contact with the cutting insert 20, 120.

While the present invention has been described with reference to one or more specific embodiments, the description is intended to be illustrative as a whole and is not to be construed as limiting the invention to the embodiments shown. It is appreciated that various modifications may occur to those skilled in the art that, while not specifically shown herein, are nevertheless within the scope of the invention.

What is claimed is:

1. An indexable cutting insert (20, 120) comprising:
opposing upper and lower end surfaces (22, 24) with a continuous peripheral side surface (26) and a central axis (A1) extending therebetween,
upper and lower peripheral edges (28, 30) formed at the intersection of the peripheral side surface (26) and the upper and lower end surfaces (22, 24), respectively, and
a number N upper cutting edges (36) formed on the upper peripheral edge (28) where N≥2,
the peripheral side surface (26) including:
adjacent to the upper peripheral edge (28), a continuous upper relief surface (32) which is non-circular in a cross-section taken in a first horizontal plane ($P_H1$) perpendicular to the central axis (A1), and
spaced apart from the upper peripheral edge (28), a continuous upper abutment surface (34a) which is circular in a cross-section taken in a second horizontal plane ($P_H2$) perpendicular to the central axis (A1),
wherein:
each upper cutting edge (36) exhibits mirror symmetry about a bisector plane ($P_B$) containing the central axis (A1) and bisecting said each upper cutting edge (36);
in an end view of the cutting insert (20, 120), the upper peripheral edge (28) is non-circular and exhibits N-fold rotational symmetry about the central axis (A1); and
in a side view of the cutting insert (20, 120), each upper cutting edge (36) is non-linear.

2. The cutting insert (20, 120) according to claim 1, wherein each upper cutting edge (36) circumferentially extends 360/N° along the upper peripheral edge (28).

3. The cutting insert (20, 120) according to claim 1, wherein the upper abutment surface (34a) is conical, having an upper abutment diameter (Du) which decreases in a direction away from the upper end surface (22).

4. The cutting insert (20, 120) according to claim 1, wherein any point on the upper peripheral edge (28) is located further from the central axis (A1) than any point on the upper abutment surface (34a).

5. The cutting insert (20, 120) according to claim 1, wherein:
the cutting insert (20, 120) exhibits mirror symmetry about a median plane (M) perpendicular to the central axis (A1), and
the upper relief and upper abutment surfaces (32, 34a) are located between the upper end surface (22) and the median plane (M).

6. The cutting insert (20, 120) according to claim 1, wherein in an end view of the cutting insert (20, 120), each upper cutting edge (36) is non-linear.

7. The cutting insert (20, 120) according to claim 1, wherein in an end view of the cutting insert (20, 120), each upper cutting edge (36) is outwardly convex in relation to the central axis (A1).

8. The cutting insert (20, 120) according to claim 1, wherein:
the peripheral side surface (26) includes a continuous lower relief surface (50) adjacent the lower peripheral edge (30) and a continuous lower abutment surface (34b) spaced apart from the lower peripheral edge (30); and
the lower relief surface (50) is identical to the upper relief surface (32); and
the lower abutment surface (34b) is identical to upper abutment surface (34a).

9. The cutting insert (20, 120) according to claim 8, wherein in cross-sections taken in mutually perpendicular first and second vertical planes ($P_V1$, $P_V2$) containing the central axis (A1) and intersecting the peripheral side surface (26), the upper and lower abutment surfaces (34a, 34b) together form a V-shape.

10. The cutting insert (20, 120) according to claim 9, wherein in the cross-sections taken in the first and second vertical planes ($P_V1$, $P_V2$), the upper and lower abutment surfaces (34a, 34b) together form an external obtuse abutment angle ($\alpha 2$).

11. The cutting insert (20, 120) according to claim 8, wherein in a cross-section taken in any plane containing the central axis (A1), the upper and lower abutment surfaces (34a, 34b) form a V-shape.

12. The cutting insert (20, 120) according to claim 1, wherein in an end view of the cutting insert (20, 120), a first imaginary circle (C1) circumscribes the upper peripheral edge (28) at N discrete radially outermost points (No1, No2, No3, No4).

13. The cutting insert (20, 120) according to claim 12, wherein each upper cutting edge (36) extends between two of the N radially outermost points (No1, No2, No3, No4).

14. The cutting insert (20, 120) according to claim 12, wherein any two circumferentially adjacent upper cutting edges (36) merge at one of the N radially outermost points (No1, No2, No3, No4).

15. The cutting insert (20) according to claim 12, wherein the N radially outermost points (No1, No2, No3, No4) are located closer to the second horizontal plane ($P_H2$) than any other point on the upper peripheral edge (28).

16. The cutting insert (120) according to claim 1, wherein each upper cutting edge (36) has a plurality of discrete axially uppermost points (Nu1, Nu2, Nu3, Nu4).

17. The cutting insert (20, 120) according to claim 1, wherein the upper peripheral edge (28) has exactly four upper cutting edges (36), and N=4.

18. The cutting insert (20, 120) according to claim 1, wherein:
the upper end surface (22) includes a planar upper support surface (38), and
the upper peripheral edge (28) is entirely located closer to the second horizontal plane ($P_H2$) than the upper support surface (38).

19. The cutting insert (20, 120) according to claim 18, comprising a through bore (40) coaxial with the central axis (A1) opening out to the upper support surface (38).

20. The cutting insert (20, 120) according to claim 18, wherein:
the upper end surface (22) includes a continuous rake surface (42) adjacent to the upper peripheral edge (28) and a ramp surface (44) adjacent to the upper support surface (38);
the rake surface (42) extends radially inwardly towards the second horizontal plane ($P_H2$); and
the ramp surface (44) extends radially outwardly towards the second horizontal plane ($P_H2$).

21. The cutting insert (20, 120) according to claim 18, wherein the ramp surface (44) is interrupted by a plurality of circumferentially spaced apart protrusions (46).

22. The cutting insert (20, 120) according to claim 18, wherein each of the protrusions (46) is partially located on the rake surface (42).

23. The cutting insert (20, 120) according to claim 21, wherein, in an end view of the cutting insert (20, 120), each of the protrusions (46) includes a convex shaped radially outer portion (48).

24. The cutting insert (20, 120) according to claim 21, wherein the plurality of protrusions (46) are greater in number than the plurality of N upper cutting edges (36).

25. The cutting insert (20, 120) according to claim 21, wherein the plurality of protrusions (46) are greater in number, by at least a factor of six, than the plurality of N upper cutting edges (36).

* * * * *